United States Patent Office 3,404,233
Patented Oct. 1, 1968

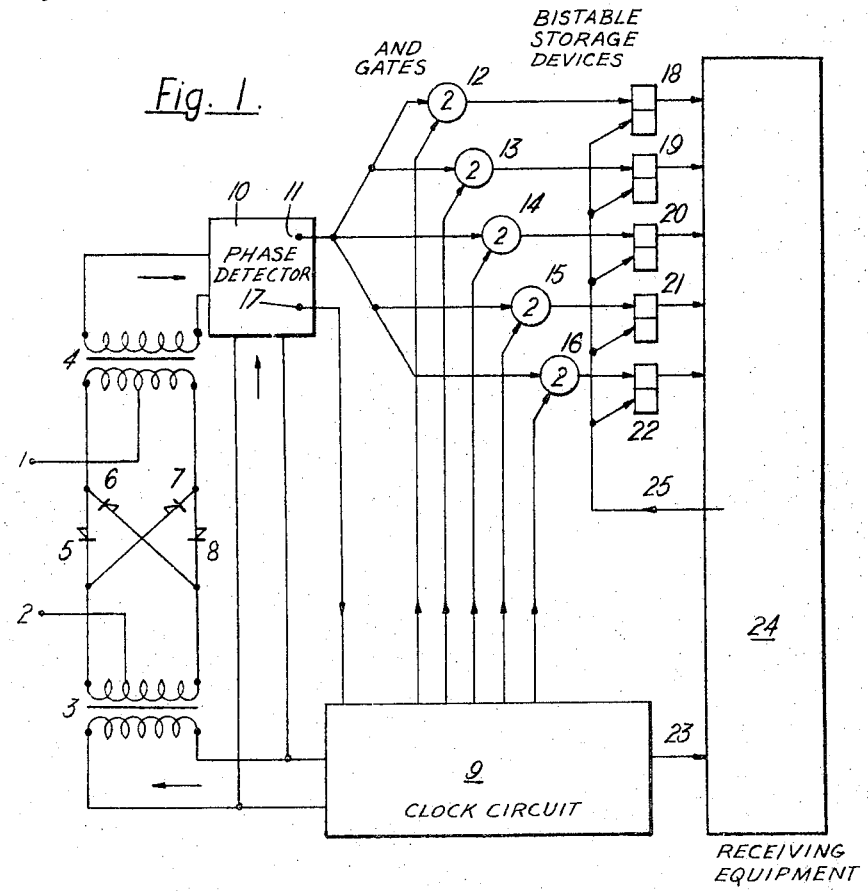
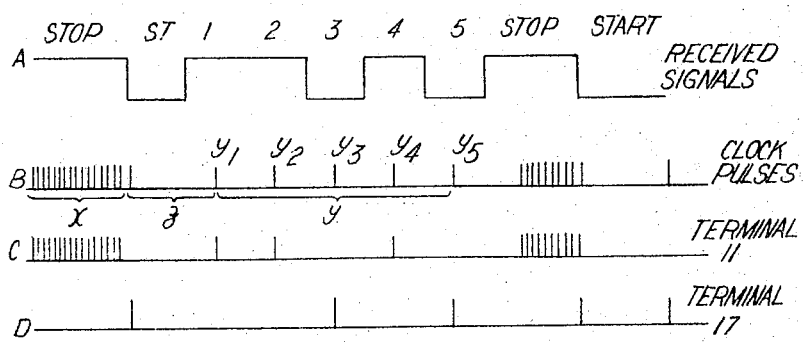

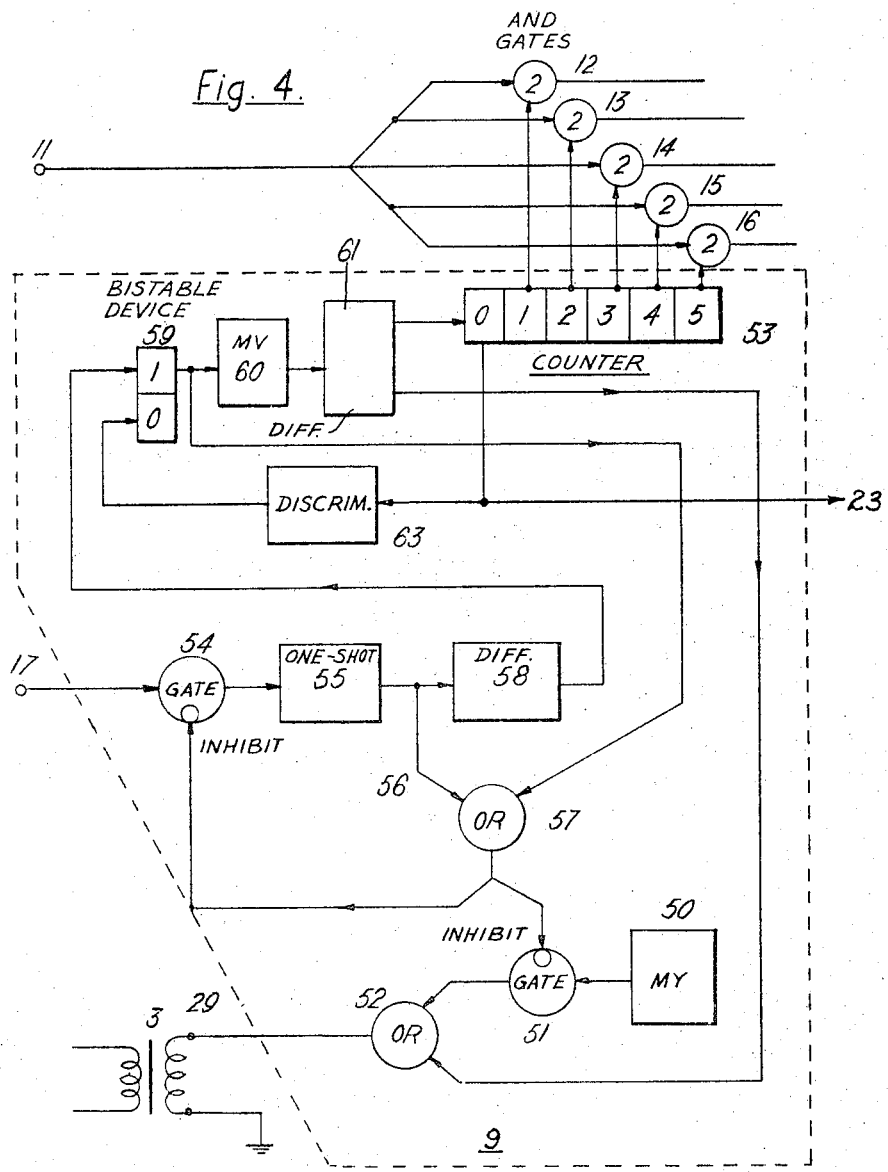

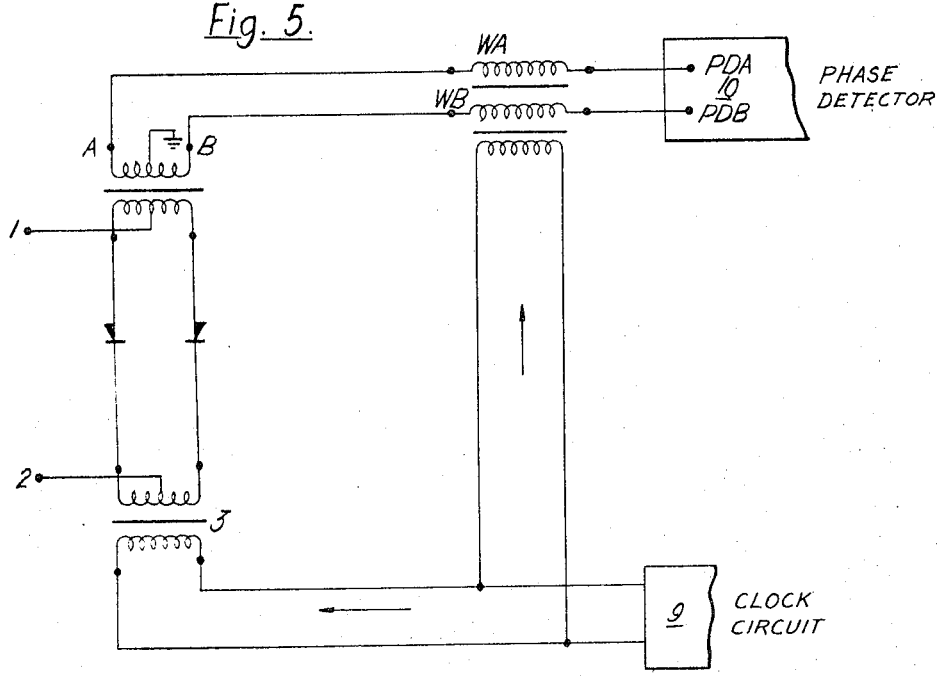
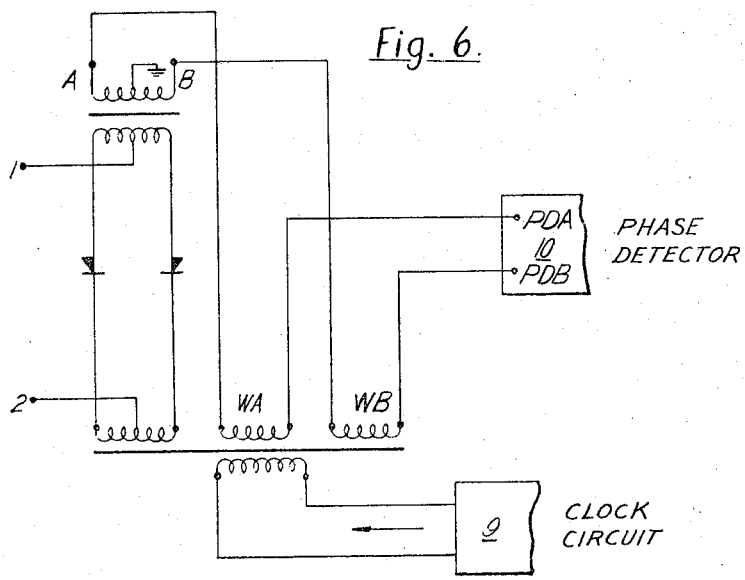

3,404,233
TELEGRAPH LINE TERMINATION MEANS WITH SWITCHING FROM HIGH SAMPLING RATE TO LOW SAMPLING RATE ON DETECTION OF AN INCOMING SIGNAL
Frederick P. Mason and John W. Peters, Hollingbury, Brighton, England, assignors to Creed & Company Limited, Hollingbury, Brighton, Sussex, England, a British company
Filed Sept. 16, 1965, Ser. No. 487,836
Claims priority, application Great Britain, Oct. 16, 1964, 42,305/64
8 Claims. (Cl. 178—88)

ABSTRACT OF THE DISCLOSURE

A telegraph line isolator for an electronic teleprinter which enables the teleprinter to be cognizant of signals on a telegraph line without there being a direct electrical connection therebetween. The teleprinter is arranged to interrogate the line by a series of brief pulses applied thereto via a transformer, the answer to which interrogation, also in the form of brief pulses, is applied to the teleprinter via another transformer.

---

The present invention relates to an electrical input circuit for telegraph receiving equipment, for interconnecting such equipment and a telegraph line.

In conventional telegraph systems, the above function of interconnecting a telegraph line and a telegraph receiving equipment such as a teleprinter is normally done by a telegraph relay. Such a device automatically provides the electrical isolation which is desirable between the line and the telegraph receiving equipment.

The process entailed is that the line current input generates an analogous magnetic field which generates an analogous mechanical force which generates an analogous mechanical displacement. The first displacement occurring in response to the receipt of a character signal corresponds to the starting transition and is utilised to initiate a cycle of local mechanical operations one part of which is the sampling at intervals of the subsequent displacements in order to ascertain what code combination is being received. In the case of electronic telegraph receiving equipment the counterpart would differ only in that, instead of analogous mechanical displacements, there would be analogous electrical currents. Whilst this conversion from line current to analogous local current confers considerable freedom in the choice of sampling technique, there would be no point in the conversion if it were feasible to sample the line currents directly without eletrical connection therewith. Accordingly, it is an object of this invention to provide an electrical input circuit for interconnecting a telegraph line and a telegraph receiving equipment in which line isolation is provided and in which the line signals are directly sampled.

In accordance with the present invention, there is provided:

An electrical input circuit for telegraph receiving equipment which comprises a telegraph line termination via which telegraph signals are received, a local source of electrical pulses which normally supplies pulses to said line termination at a high rate compared with the rate at which telegraph signal elements are received, each said pulse on arrival at said line termination causing the latter to sample the condition of said line, means responsive to the detection, as a result of said sampling, that a telegraph signal combination is commencing to arrive over said line to cut off said pulses at said high rate and to apply to said line termination pulses occurring at a low rate, the pulses occurring at said low rate including a pulse for each instant at which the line should be sampled to detect the incoming signal combination, and means responsive to the sampling and detection of the last element of a combination to cut off said low-rate pulses and apply said high-rate pulses to said line termination.

An embodiment of the invention will now be described with reference to the accompanying drawings, in which:

FIG. 1 is a schematic representation of an embodiment of the present invention.

FIG. 2 shows certain waveforms which will be referred to in the description of the arrangement of FIG. 1.

FIG. 4 shows in some detail the clock system used in the arrangement of FIG. 1.

FIGS. 5 and 6 show schematic representations of other embodiments of the invention.

Figure 3:
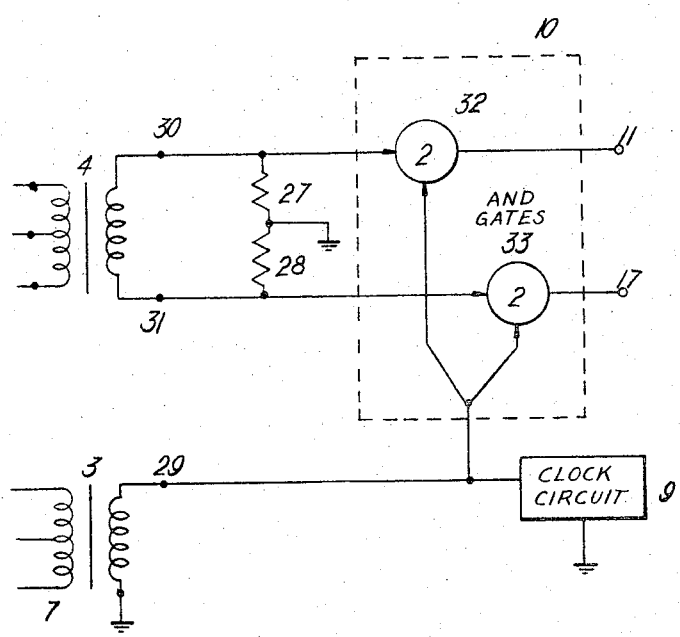
FIG. 3 shows in more detail the phase detector used in the arrangement of FIG. 1.

In the arrangement shown in FIG. 1, the two conductors 1 and 2 of a telegraph line are connected to tappings on the secondary winding of a first transformer 3 and on the primary winding of a second transformer 4. These two windings are interconnected by a balanced diode ring modulator formed by the semiconductor diodes 5, 6, 7 and 8 respectively. The primary winding of the transformer 3 is fed by electrical pulses from a clock system 9, and the secondary winding of the transformer 4 feeds its output to the receiving equipment via certain other circuitry which will be referred to later.

The telegraph signals which are received on the line 1, 2, are of one of two electrical conditions (e.g. double-current working), and it will be assumed that when the line is in the marking condition, which is the normal condition of the line, the conductor 1 is negative with respect to the conductor 2, while when the line is in the spacing condition the conductor 2 is negative with respect to the conductor 1. With the diodes connected in the manner shown, it will be seen that with the line in the marking condition the pulses applied to the primary winding of the transformer 3 are transmitted from the secondary winding to the transformer 4 with one polarity, whereas if the line is in spacing conditions, the polarity of these pulses is reversed with respect to what it would have been in the marking condition.

After the above brief introductory description of the arrangement of the diode modulator, it is felt that the best way to describe the arrangement shown in FIG. 1 is to describe it during normal conditions of operation. When a new signal combination is received over the incoming line 1, 2, it is desirable that the time at which this new signal commences be determined with a high degree of accuracy. For this reason the clock circuit 9 normally supplies pulses at a relatively high frequency assuming that the signals received over the incoming line are the usual 50 baud telegraph signals, then a convenient frequency for the normal pulse repetition rate of the signals applied to the primary of transformer 3 would be 10,000 cycles per second. This is represented in line B of FIG. 2, in portion X of this line. As long as the line continues to be in the marking condition, in which the conductor 1 is negative with respect to the conductor 2, the pulses leaving the secondary winding of the transformer 4 and which are applied to a phase detector 10 have a first polarity, whereas when the line changes its condition these pulses will have a second polarity.

As long as these pulses continue in their first polarity, that is, as long as the line is still at mark, the phase detector applies the pulses which it receives to its output terminal 11. This output terminal feeds a set of two-input AND gates 12, 13, 14, 15 and 16. However, since these gates are all closed at this time this output from the terminal 11 has no effect. The commencement of a signal combination is represented by the arrival on the line 1, 2, of a spacing condition, as a result of which the conductor 1 becomes positive with respect to the conductor 2. This has the effect that the pulse leaving the secondary winding of transformer 4 and therefore the input to the phase detector 10, is of reverse polarity. At this point it should be noted that the phase detector 10 also receives as an additional input the pulses supplied from clock system 9, which it uses as a reference to determine the phase of the pulses received from the transformer 4. When these pulses are of the polarity associated with the spacing condition an output is applied to the output terminal 17 from the phase detector instead of its output 11. This output is connected to the clock system 9, and the signal applied thereover to the clock system has two effects. One of these effects is to terminate the supply from the clock system 9 of pulses at the relatively high frequency of 10 kilocycles and to replace them with pulses each of which is timed to occur at or near to the midpoint of a code element of the signal combination, while the other effect is to render effective the set of gates 12 to 16 referred to above.

Since the signals arriving over the line 1, 2, are 50 baud telegraph signals, the first of the sampling pulses supplied from the clock system 9 occurs 30 milliseconds after the pulse which reaches the clock system over the input from the phase detector 10. This pulse is the first of a series of five such pulses spaced at 20 millisecond intervals. These are the pulses y1 to y5 which can be seen in line B of FIG. 2. Consequently, at the mid-point of each of the permutable elements, the condition of the line is sampled by applying one of the y pulses to the primary winding of transformer 3, with the result that this pulse is applied from the secondary winding of transformer 4 to the phase detector with a polarity which depends on whether or not the line is then in the marking or the spacing condition. If the line is in the marking condition, the pulse leaves the phase detector 10 by its terminal 11, whereas if the line is in the spacing condition it leaves the phase detector by its terminal 17. This latter is without effect. It will be remembered that the five gates 12 to 16 are enabled from the clock system 9. This is effected by energising their input leads from the clock system 9 singly and successively, each at one of the sampling instants. Consequently for any element for which the line is in the marking condition, the appropriate one of the gates opens and sets one of the bistable storage devices 18 to 22 respectively to its mark condition.

Shortly after the pulse which enabled the gate 16, the clock pulse system 9 issues an output signal which is applied over the connection 23 to the receiving teleprinter equipment 24. This has the effect of "telling" the printing equipment that the telegraph character has been fully received and stored on the bistable circuits. It therefore responds to these five inputs in well-known manner, and having done so, it transmits an output signal over the output 25, which resets all of the bistable devices to rest. Shortly after the clock system transmitted the signal over the conductor 23, it is switched back to its normal condition in which it generates pulses of the relatively high frequency.

It will be seen that by sampling the line rapidly prior to the arrival of the telegaph signal, it is possible to determine with a considerable degree of accuracy the instant at which the telegraph combination commences. However, such rapidity of sampling is quite pointless once the commencement of a telegraph character has been recognised. At this point all that is needed is to sample at or near to the mid-points of the five permutable elements of the combination. Consequently the pulse generator forming the clock pulse system is then converted to a slow-operating condition in which it generates the five sampling pulses each of which is effective to sample the line directly. As soon as a character has been fully dealt with, as already mentioned, the clock pulse system reverts to its normal condition. This feature facilitates the design of the equipment to which the results of the samplings are applied.

In the arrangement just described, the components directly associated with the line circuits, i.e. transformers 3 and 4 and the diodes 5, 6, 7, 8 of the ring modulator, can be of high calibre to withstand line surges and fault conditions, but this does not detract from the "telegraphic" performance. For instance the diodes could have 2 ampere ratings.

FIG. 3 shows a relatively simple form of phase detector which can be used in the arrangement of FIG. 1. In the input of this circuit, there is a potential divider formed by two resistors 27 and 28 of equal value, the centre-point between which is earthed. This centre-point earthing provides a datum potential for the phase detector. It is assumed that the direction of winding of the transformers 3 and 4 is such that a marking condition of the line causes, when a pulse occurs which makes the terminal 29 of the primary winding of transformer 3 positive, a positive potential at terminal 30 and a negative potential at terminal 31 of the secondary winding of transformer 4. When the line is in the spacing condition these conditions of the output terminals of transformer 4 are reversed.

The outputs from the transformer 4 are connected to two AND gates 32 and 33, each of which also has an input connected to the output from the clock system 9. These gates are of the kind in which the application of two positive pulses will result in the emission of a positive pulse, whereas one negative pulse and one positive pulse or two negative pulses, or one pulse only, or no pulses at all, produce no output. Consequently it will be seen that any pulse which renders the terminal 30 positive will lead to an output pulse at the terminal 11 whereas a pulse which renders terminal 31 positive will lead to an output pulse at the terminal 17. Hence the production of a positive pulse by the clock system 9 during a marking condition of the line causes the positive pulse to appear at terminal 11 and no pulse at terminal 17. Similarly when the line is in the spacing condition the positive pulse is produced at terminal 17, and no pulse is produced at terminal 11.

Referring now to FIG. 4, which relates to the clock system, the clock system proper is the portion of the figure which appears within the broken line. This figure also includes terminal 11 and the gates 12 to 16, the terminal 17 and part of the transformer 3.

The simplest way to describe this circuit will be to describe a cycle of operations such as occurs during the reception of a telegraph character.

During the idle condition of the line, in which a marking condition prevails, a multivibrator 50 included in the clock system emits pulses at the rate of approximately 10,000 per second. These pulses pass through a gate 51 having an inhibit input and an OR gate 52, from which they are applied to the terminal 29 of the transformer 3. Since the line is in the marking condition, the pulses are applied via the diode modulator to the terminal 11, and hence reach the gates 12 to 16 referred to above. These gates are at this time all closed because the six-stage counter indicated at 53 is at this time in its nought or rest condition. Consequently the gates give no output.

As soon as the line condition changes from marking to spacing, the pulses which are applied from the clock system to the terminal 29 cease to appear at the terminal 11, but appear instead at the terminals 17. These pulses are applied via a gate 54 having an inhibit input to a one-shot 55. The one-shot 55, when triggered by the first pulse which it receives over the input 17 applies its output potential over conductor 56 to another OR gate 57, whose output inhibits the gate 51 to cut off the supply of pulses from the multivibrator 50, and also inhibits the gate 54. The reason for this is that, having completed its operation of stopping the supply of the fast pulses, one-shot 55 has no further function to perform.

The output condition of the one-shot 55 is passed by a differentiator 58 which latter converts its input into a short pulse, and this sets a bistable device 59, which is normally in its zero condition, to its "1" condition. The "1" output from the bistable device 59 has two effects: one of these is to apply a further pulse to a second input to the OR gate 57, to make sure that the latter can properly control the two inhibit gates 51 and 54, and the other is to switch on a second multivibrator 60. The latter emits an output which is a square wave at 50 cycles per second, assuming that the telegraph signalling is 50 baud signalling, and the pulses supplied by this multivibrator are applied to a differentiator 61. The uppermost output terminal of the differentiator 61 emits a pulse on each negative going transition of the square wave signal from the multivibrator 60, and the lowermost output terminal emits a pulse on each positive going transition. The pulses produced at the uppermost output terminal of the differentiator drive the counter 53, each output of which other than its rest output, energises one of the gates 12 to 16. Consequently each of these gates is energised for a period which at least embraces the code element to which it relates.

The other output pulses from the differentiator 61 are applied via the OR gate 52 already referred to the terminal 29 of the transformer of the modulator. Consequently the new slow pulses are applied both to the diode modulator and to the sampling gates.

For each permuttable element the counter 53 steps once, so that one gate is disabled and the next gate enabled.

This continues until the sixth step of the counter as the result of the sixth pulse from the uppermost terminal of the differentiator 61, which pulse resets the counter to its nought or rest condition. When the counter reaches its rest condition the output therefrom is applied to discriminator 63 and this sets the bistable device back to its rest or zero condition.

The resetting of the bistable device 59 to its rest condition removes the output from its "1" side, which stops the multivibrator 60. Hence the sampling pulse output is disabled. In addition, the removal of the "1" output from the bistable device removes the input from the OR gate 57. Hence the inhibiting conditions present on the two gates 51 and 54 disappear, so that the gates 51 and 52 can now pass the rapid pulses to the diode modulator. In addition, the gate 54 can now respond, or rather more accurately, allow the one-shot 55 to respond, to any pulse indicative of a spacing condition on the lines.

So far operation of the input circuit has been described only in respect of the "double-current" working condition of the telegraph line, some modification is necessary to the circuit to permit its operation under "single-current" working condition. In "single-current" working, one of the two signalling conditions is the "no-current" condition, and in this condition the modulator is neutral and thus no pulses are applied to the phase detector. Thus for this condition no dependable indication can be given, and it is necessary to make a modification to the circuit which is now to be described with reference to FIG. 5. This modification proposes the addition of circuitry and components for mixing electric pulses derived from the local source with pulses derived from the second transformer and applying the mixture to the phase detector 10. The components are, preferably, two additional floating transformer windings each connected in series with one of the conductors interconnecting the second transformer 4 to the phase detector 10. These two windings may be carried on a separate transformer as shown or, if convenient, carried on the first transformer 3 as shown in FIG. 6.

In operation, a marking current on the line will cause the second transformer 4 to give a positive-going pulse at its terminal A and a negative-going pulse at its terminal B, with amplitudes of, for example, one volt. With these conditions, and with the pulses from the winding WA to the phase detector 10 being, for example, half a volt negative and those from winding WB to the phase detector 10 being half a volt positive, then the terminals PDA and PDB will receive, respectively, pulses which are the algebraic sum of 1 volt positive and a half volt negative e.g. a half a volt positive, and pulses which are the algebraic sum of 1 volt negative and a half volt positive e.g. half a volt negative.

In the case where there is absence of line current, i.e. when the line is in the spacing condition, terminals A and B will be at zero potential and terminal PDA will receive only the pulse from winding WA, e.g. half a volt negative, and terminal PDB will receive only the pulses from winding WB e.g. half a volt positive.

In "double-current" working of the circuit, one volt positive pulses and one volt negative pulses would be applied to terminals PDA and PDB respectively whenever the line was in a marking condition, and one volt negative pulses and one volt positive pulses would be applied to those terminals respectively whenever the line was in a spacing condition. In the "single-current" working condition of the circuit that has just been described half a volt positive pulses and half a volt negative pulses are applied to terminals PDA and PDB respectively whenever the line is in the marking condition; whilst half a volt negative pulses and half a volt positive pulses, pulses are applied to those terminals respectively whenever there is a no current condition on the line e.g. the spacing condition in "single-current" working. Thus the only difference noted by the phase detector 10 between "single-current" and "double-current" working is a change of voltage. If this happens to be an inconvenient change it can be eliminated by changing the number of transformer turns, or providing additional amplification at terminals PDA and PDB. A simple switching arrangement may be provided to instantly convert the circuit for single or double current working.

It is to be understood that the foregoing description of specific examples of this invention is made by way of example only and is not to be considered as a limitation on its scope.

What we claim is:

1. An electrical input circuit for telegraph receiving equipment, which comprises a telegraph line termination via which telegraph signals are received, a local source of electrical pulses which normally supplies pulses to said line termination at a high rate compared with the rate at which telegraph signal elements are received, each said pulse on arrival at said line termination causing the latter to sample the condition of said line, means responsive to the detection, as a result of said sampling, that a telegraph signal combination is commencing to arrive over said line to cut off said pulses at said high rate and to apply to said line termination pulses occurring at a low rate, the pulses occurring at said low rate including a pulse for each instant at which the line should be sampled to detect the incoming signal combination, and means responsive to the sampling and detection of the last element of a combination to cut off said low-rate pulses and apply said high-rate pulses to said line termination.

2. An electrical input circuit as claimed in claim 1, wherein said telegraph line termination comprises a first transformer having a primary winding to which the electrical pulses from the local source may be applied a second transformer having a secondary winding from which signals may be applied to the receiving equipment, a diode modulator interconnecting the secondary winding of the first transformer and the primary winding of the second transformer so that the said modulator can control the passage of the electrical pulses from the local source to the receiving equipment, and wherein the telegraph line is connected to the termination to control the condition of the modulator such that the signals applied from the second transformer's secondary winding to the receiving equipment have either one of two possible characteristics dependent on which one of two possible line conditions exist.

3. An electrical input circuit as claimed in claim 2, wherein the characteristic which indicates the nature of the telegraph line condition of the pulses which leave the secondary winding of said second transformer is their relative polarity.

4. An electrical input circuit as claimed in claim 3, in which the pulses received from said secondary winding of said second transformer are applied to a phase detector which energises one of its outputs when the telegraph line is in a mark condition and the other of its outputs when the line is in a space condition.

5. An electrical input circuit as claimed in claim 4, and in which said change from the high speed to the low speed pulses for sampling purposes is effected in response to the presence of an output potential at the second named output of said phase detector.

6. An electrical input circuit as claimed in claim 5, and in which the electrical conditions appearing at the first-named output of said phase detectors are applied to the input to a set of gates, said gates being enabled singly and successively at the respective sampling instants, and in which the outputs of said gates control a set of bistable storage devices.

7. An electrical input circuit as claimed in claim 6, and in which the outputs from said bistable storage devices are connected to printing telegraph apparatus, which printing telegraph apparatus prints the character corresponding to the condition of said bistable storage devices when all have been set.

8. An electrical input circuit as claimed in claim 7, in which said modulator is a balanced diode ring modulator.

References Cited

UNITED STATES PATENTS 2,787,657  4/1957  Terry et al. _____ 178—53.1 X
3,294,908  12/1966  Schiebeler _____ 178—88

ROBERT L. GRIFFIN, *Primary Examiner.*

W. S. FROMMER, *Assistant Examiner.*